United States Patent [19]

Bébin

[11] 3,928,190

[45] Dec. 23, 1975

[54] METHOD OF BIOLOGICAL PURIFICATION OF SEWAGE

[75] Inventor: Jean Louis Bébin, Reuil-Malmaison, France

[73] Assignee: Degremont, Societe Generale d'Epuration et d'Assainissement, Rueil-Malmaison, France

[22] Filed: July 26, 1974

[21] Appl. No.: 492,326

Related U.S. Application Data

[63] Continuation-in-part of Ser. No. 307,635, Nov. 17, 1972, abandoned.

[52] U.S. Cl. ..................... 210/8; 210/17; 210/18
[51] Int. Cl.² .......................................... C02C 1/04
[58] Field of Search ......... 210/150, 151, 15, 16, 17, 210/18, 8, 82, 275

[56] References Cited
UNITED STATES PATENTS

| | | | |
|---|---|---|---|
| 2,051,727 | 10/1935 | Levine et al. | 210/150 |
| 3,293,174 | 12/1966 | Robjohns | 210/17 |
| 3,377,272 | 4/1968 | Cann | 210/18 |
| 3,543,937 | 12/1970 | Choun | 210/150 |
| 3,563,888 | 2/1971 | Klock | 210/150 |
| 3,617,539 | 11/1971 | Grutsch et al. | 210/82 |
| 3,695,433 | 10/1972 | Hirs et al. | 210/275 |
| 3,713,543 | 1/1973 | Heaney | 210/8 |
| 3,853,752 | 12/1974 | Tymoszczuk | 210/150 |

*Primary Examiner*—Frank A. Spear, Jr.
*Assistant Examiner*—Benoit Castel
*Attorney, Agent, or Firm*—Wenderoth, Lind & Ponack

[57] ABSTRACT

Method of purifying sewage containing a strong organic pollution, which comprises two successive stages, that is, a flocculation stage and a biological filtration stage, characterized in that the flocculation stage is performed by using non-toxic and non-bacteriostatic reagents, and that the immersed biological filtration stage is performed on a bed of material having a moderate granulometry and a surface area comprising, on the one hand, limited zones permitting the fixation and preservation of the bacterial film, even under strong and repeated washing or flushing stream conditions, and on the other hand a main portion having a smooth appearance permitting the easy removal by washing of any bacterial culture carried by this smooth surface portion. The wash water of the filter thus constituted is recycled upstream of the flocculation stage, this recycling producing a permanent reseeding of the sewage and therefore maintaining of the biological equilibrium of the filtering mass.

6 Claims, 4 Drawing Figures

METHOD OF BIOLOGICAL PURIFICATION OF SEWAGE

This is a continuation-in-part of application Ser. No. 307,635, filed Nov. 17, 1972, now abandoned.

BACKGROUND OF THE INVENTION

The present invention relates in general to the biological treatment of sewage and has specific reference to an improved method of biological purification of waste water, intended more particularly for the treatment of sewage having a high organic pollution potential, such as domestic or sanitary sewage, the effluents from the food industry, paper mills, etc.

It is known to resort to the biological treatment of sewage which consists in applying a chemical flocculation for removing from the treated water the materials in suspension and the colloids, this treatment being followed by a biological filtration process performed on beds of porous or cellular or cavernous materials on which the sewage already treated by flocculation is caused to trickle. These beds are exposed to an aeration in order to supply throughout the bed mass the oxygen layer necessary for maintaining the aerobiosis of the bacteria contained in the water to be treated, which bacteria will themselves perform the biological purification of the water.

However, these methods, based on a biological filtration following a chemical filtration of the sewage require, to avoid an undesired bacterial proliferation in the biological filter, the use of flocculation reagents such as salts of Zn, Cd, Cu, etc., that is, substances imparting a partial toxicity to the water medium, thus constituting a serious inconvenience.

Biological filters as conventionally used in the field of sewage disposal, with or without preliminary flocculation, tend to become clogged on account of their specific texture and are inevitably the seat of untimely and undesired anaerobic fermentations. Therefore, the filter must be washed at frequent intervals. These washing steps are attended by the draining off of the bacterial mass, thus making it necessary to reseed the medium. Moreover, after each washing operation, a drop in the purification efficiency is inevitably observed.

The hitherto known methods of sewage disposal comprising two stages, i.e., flocculation by using salts of Zn, Cd, Cu, and biological filtration through a bed of sand, coal, plastic products, etc., cannot ensure a really efficient treatment of sewage having a heavy percentage of dissolved polluting substances. In fact, in these methods it is particularly difficult, in the case of strongly polluted sewage, to avoid the growth, on the biological filter, of an anaerobic flora yielding an odorous treated water, notwithstanding the aeration, whether with atmospheric air or oxygen, or the recycling of one fraction of the purified water through the filter.

SUMMARY OF THE INVENTION

The method according to this invention is characterized in that the flocculation stage is performed by using non-toxic and non-bacterio-static reagents, and the immersed biological filtration stage is performed on a bed of material having a moderate granulometry and a surface area comprising, on the one hand, limited zones permitting the fixation and preservation of the bacterial film, even under strong and repeated washing stream conditions, and, on the other hand, a smooth appearance permitting the removal by washing of any bacterial culture carried by this smooth surface portion, the wash water of the filter thus constituted being recycled upstream of the flocculation stage, this recycling producing a permanent reseeding of the sewage and therefore maintaining of the biological equilibrium of the filtering mass.

The features and advantages characterizing the method of the present invention will appear as the following description proceeds.

The sewage or waste water purification treatment method according to this invention comprises two stages:

1. a flocculation stage for removing the matter in suspension and colloids. During this stage, only non-toxic, non-bacteriostatic flocculation reagents, such as iron or alumina salts, for example ferric chloride or aluminum sulfate, are used. This flocculation is performed under maximum efficiency conditions so that only the dissolved polluting material is directed to the second stage of the process.

The term "non-toxic and non-bacteriostatic flocculation reagents" is a term well-known and understood by those skilled in the art to mean flocculation reagents which destroy neither the protozoa or the bacteria existant in a sewage purifying system. The types of such non-toxic and non-bacteriostatic flocculation reagents are well-known in the art, and the above listed examples are by no means exhaustive of the types of materials encompassed by this term. For instance, it is known that below a concentration of 130mg/1 of aluminum sulfate there is no toxicity to protozoa, and therefore the bacteria level is not effected, in a sewage treatment system. Aluminum sulfate is therefore a non-toxic and non-bacteriostatic flocculation reagent. The necessary concentrations of the reagents to provide non-toxic and non-bacteriostatic properties would be well-known to those skilled in the art.

2. a biological filtration stage, performed on an immersed bacterial bed having a twofold action, i.e., biological, on the one hand, and physical on the other hand, this controlled twofold action being permitted by the specific properties of the biological filter, which are described hereinafter.

This biological filter consists of a specific material, obtained by heating a clay and an organic material, such as dextrin, in a known manner, such as at about 900°C. In this manner, there is obtained a porous mass of granular material possessing hollow zones produced by the destruction of the organic material by the heat, which zones will permit the fixation and preservation or holding of the bacterial film, even under the conditions of vigorous washing. The material also possesses smooth surface zones permitting the removal, by washing, of any culture from this smooth surface portion.

More specifically, a suitable clay material has mixed therewith an organic material such as dextrin. This mixture is then fired at a suitable temperature, and during firing, the organic material is calcined. The escape of gases of such a combustion produces cavities in the surfaces of the grains. Between the cavities, the surface of the grains are smooth, i.e., there is no microporosity of the grains. The cavities produced in this manner are sufficiently large for the receipt of bacteria. However, completely unexpectedly the bacteria is not removed from the cavities during a backwashing of the filter mass by normal and even vigorous backwashing operations.

It is to be understood that the present invention is not limited to the use of dextrin in the formation of the granular filter material. Any suitable organic compound, as would be readily understood by those skilled in the art, which will calcine in the above described manner to produce surface cavities on the grains may be employed. For instance, it is contemplated that materials such as sawdust, starch, cellulose powder, and liquid glucose may be employed. Further, the specific type of clay material may be varied.

The following specific example is exemplary only of one manner of forming a suitable filter material for use in accordance with the present invention.

There is produced a homogeneous mixture from one kilogram of argillaceous earth and 350 grams of finely pulverized wood powder. This mixture is placed in a furnace and baked until a temperature of 900°C is reached, whereat the clay is baked and the wood powder is destroyed. This results in released gases forming cavities appearing in the surface of the clay.

It will be understood that the material, quantities and proportions of the above example can be varied to result in the desired specific filter material.

This specific material has a minimum percentage, ranging from 25 to 30%, of fixation zones for the entire surface area, so that an intense biological purification is obtained immediately after the washing step.

This material provides valuable advantages in comparison with the hitherto conventional materials, such as sand, coal, or plastic products. Thus, no privileged zones are found in a sand bed. The use of coal is attended by serious problems, due to the rapid clogging thereof in case of first-stage flocculation with non-toxic reagents. Plastic products are objectionable, because they are both bulky and expensive, and furthermore their filtering action is rather poor.

In addition, the specific material according to the present invention has a low granulometry, for instance 0.5 to 4 mm, and preferably about 2 mm, to permit the physical filtration effect. The granulometry is selected as a function of the magnitude of the dissolved pollution. It provides:

a bacterial film surface area sufficient for producing a purification at the desired efficiency value;

a filtration effect whereby the few solid particles in suspension and the colloids having passed through the flocculation stage, as well as the remains of the bacterial film having possibly been separated from the upper layers of the specific material, are safely retained.

This filtration effect is such that a secondary decantation or settling tank located downstream of the filter can be dispensed with.

However, the grain size is sufficient to avoid any unduly rapid clogging of the surface, as this would reduce the purifying biological action to a relatively thin layer.

This low-granulometry, slow-clogging material is advantageous in that a relatively high filtration rate, for example as high as 8 to 13 cubic meters per square meter per hour, can be obtained during the treatment, and that it permits the recycling of the purified water upstream of the filter.

This recycling, for example in the treatment of sewage having a high percentage of dissolved polluting substances, permits the reduction of the oxygen consumption required for the aeration, by dilution of the water to be treated, the homogenizing of the bacterial flora throughout the filter mass and improving the efficiency of the purification process.

The biological filtration as performed by applying the method of this invention comprises an aeration with air attended by a strong recycling of purified water or with oxygen-enriched air or pure oxygen, this aeration being performed in the known fashion, but, in the present instance, such that a complete aerobic condition is obtained, even in the case of sewage having a very heavy content of dissolved polluting substances and solids. The dissolved $O_2$ content may be as high as 25 to 30 mg per liter before the filtration.

Therefore, the constitution of the biological filter used for carrying out the method of this invention is such that the biological purification accomplished therewith is controllable, with an efficiency that can be anticipated, without any undesired and untimely bacterial proliferations, while permitting an intense purification with relatively reduced power and oxygen consumptions.

The washing or flushing of this filter, performed in a known manner, permits the accurate controlling of its biological action, because the filter material has a surface comprising, on the one hand, limited areas occurring, for example, in the form of anfractuosities capable of fixing the bacterial film and retaining the same in these areas during the flushing operations, and on the other hand a smooth appearance facilitating the removal, by washing, of any microbial culture from this smooth surface portion.

During the backwashing operation in accordance with the present invention, it is to be understood that such operation will be conventional or even more vigorous than known backwashing operations, as regards the quantity and speed of backwashing liquid and air. One specific example would involve the injection of air at 25 cubic meters per hour for 10 minutes, and an injection of backwashing water at 20 cubic meters per hour for 10 minutes, followed by an injection of backwashing water at a reduced rate of 5 cubic meters per hour for 20 to 30 minutes. It is of course to be understood that this is exemplary only, and that those of ordinary skill in the art will understand that backwashing conditions will vary dependent upon a given installation. The injection of the air stirs the grains of the granular filter material to cause their mutual frictional contact to tear off the bacterial layer developed on the smooth portions of the grains of the material. Totally unexpectedly, however, the portion of the bacterial film within the cavities is not torn off and remains therein.

Thus, the method of this invention comprises two stages, namely a flocculation stage using a specific reagent, and a biological filtration stage using a well-defined material, these two stages being interconnected by the fact that the wash water from the biological filter is recycled upstream of the flocculation stage, thus permitting on the one hand the flocculating and collecting of excess bacterial culture from the assimilation or digestion of the dissolved polluting substances, and on the other hand the re-seeding of the water before the other stage to promote the growth of predatory protozoa limiting naturally the growth of the bacterial film while permitting the reduction of the frequency of the biological filter washing or flushing operations.

BRIEF DESCRIPTION OF THE DRAWINGS

The system for carrying out the method of this invention is arranged as follows, with reference to the attached drawings.

DETAILED DESCRIPTION OF THE INVENTION

Figure 2:
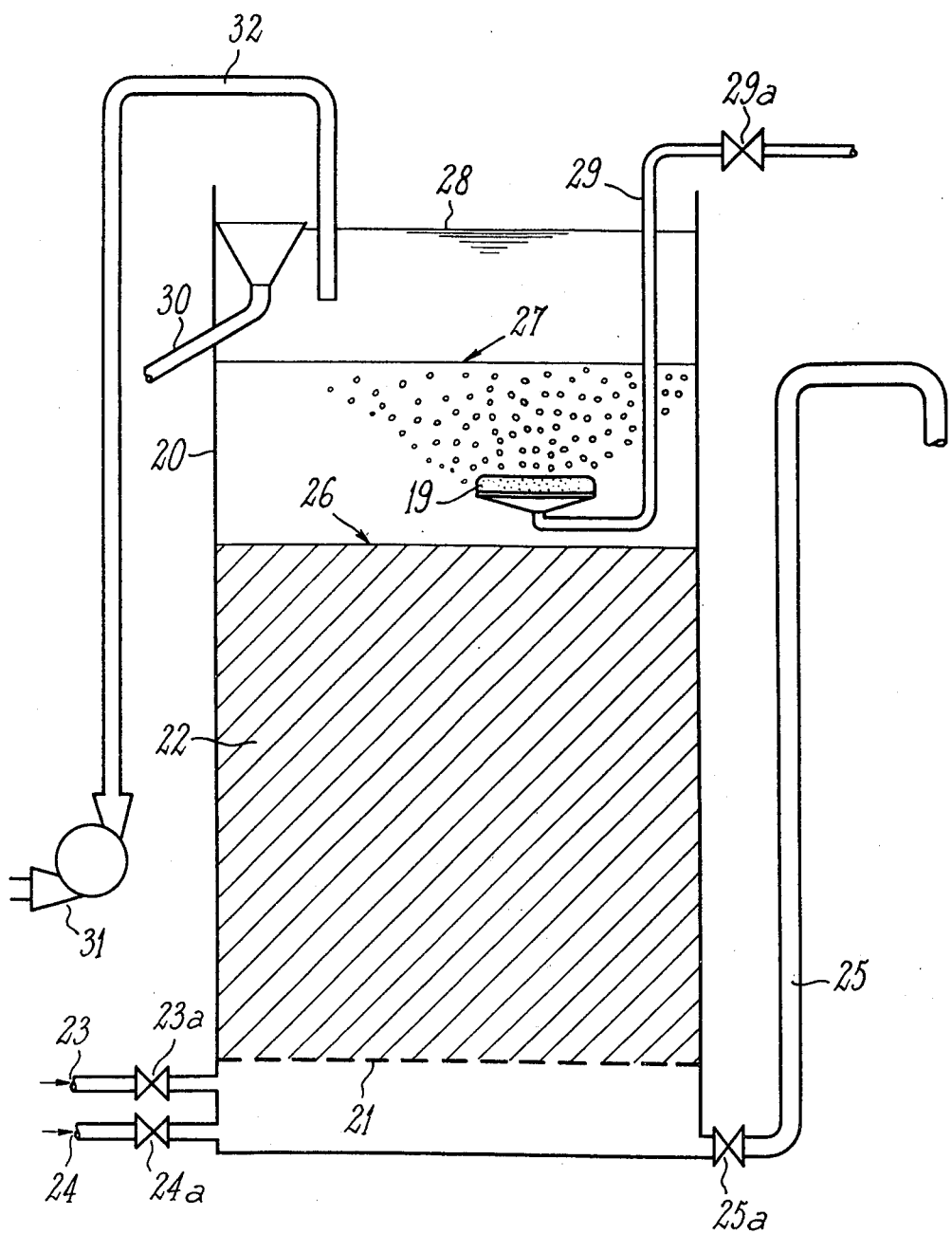
FIG. 2 is a diagrammatic elevational and sectional view taken on a larger scale of a biological filter used in this system.

After a mechanical preliminary treatment at 10, the sewage or waste water is pumped into a flocculation tank 11 and receives therein, through metering pumps 15 and 16, the flocculation reagents from tanks 13 and 14. The thus flocculated water is directed to the settling tank 17 in which, after clarification, it is fed by a pump 18 to the biological filter illustrated on a larger scale in FIG. 2, in which it percolates through the purifying mass after having been aerated by the device 19.

The biological filter proper (FIG. 2) comprises a cylindrical tank 20 of steel or plastic material, or a parallel-ipipedic concrete tank, provided with a double horizontal bottom. The upper wall 21 of this double floor is perforated to permit fluid circulation and consists of a perforated sheet metal member or a plate provided with small nozzles.

Figure 3:
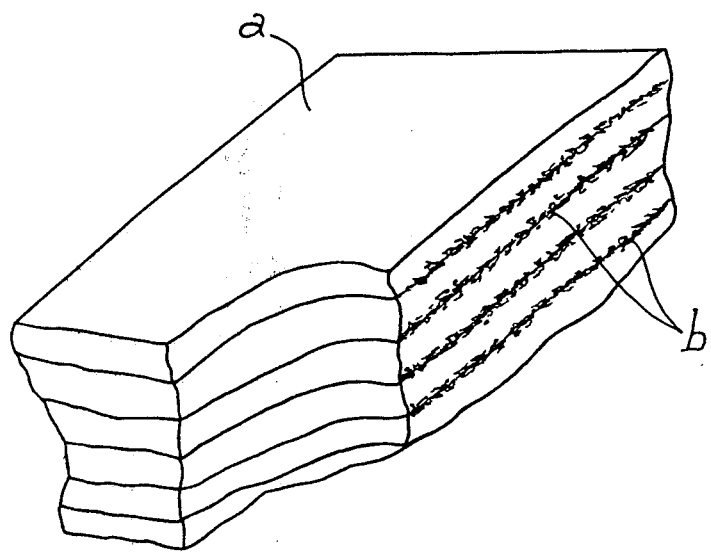
FIGS. 3 and 4 are perspective views of two different filter materials.
Figure 4:
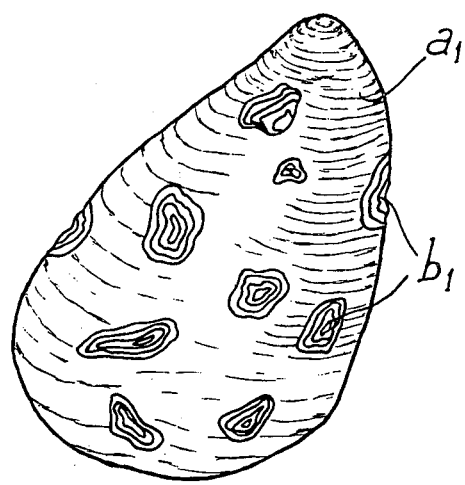

Above this partition 21, the tank is filled with a mass 22 of material such as illustrated in FIGS. 3 and 4. This material comprises fixing zones $b$, $b_1$ for the bacteria, while having otherwise a smooth surface $a$, $a_1$.

The space left between the two horizontal walls of the double-walled bottom has therein an air inlet 23 and a wash water inlet 24.

The treated water is extracted through a pipe line 25 provided with a control valve 25a. This pipe line 25 rises to a level sufficient to keep the water level well above the filtering mass, under low-level or minimum-level conditions.

In the mass of water maintained between the fixed level 26 of the material and the water level (which may vary between levels 27 and 28), an aeration device comprising a porous body 19 supplied with air through a conduit 29 is provided, this conduit being controlled by means of a suitable valve 29a. The upper water level 28 is determined by an overflow device 30.

The water to be purified biologically is supplied via a pump 31 to the filter through a conduit 32. It flows downwards through the filter 22 and perforated partition 21 to the outlet. The purified water is recycled through a conduit 33 upstream of the biological filter, by virtue of a pump 34.

The filter is flushed or washed by means of a flushing system operating in countercurrent relationship to the normal water circulation through the filter 22. The cleaning action is obtained by injecting air through pipe line 23 and water through pipe line 24. The function of the air injection is to strongly stir the grains of the filter material so as to cause their mutual frictional contact and to thus tear off the bacterial layer having developed on the smooth portions of the material. Since the fixing or retaining areas are recessed in relation to these smooth portions, they remain lined with a bacterial film.

Then the injection of water makes it possible to carry along the fragments of the bacterial culture, thus detached from the smooth portions of the material, as well as all the solids in suspension retained by the filter since the preceding washing operation.

During this washing or cleaning operation, the supply of oxygenation air is cut off by means of valve 29a, and the delivery of purified water is cut off by means of valve 25a, so that the level rises up to level 28, and the wash water is recycled at the head of the physico-chemical treatment upstream of the flocculation station 11 by means of overflow device 30 and line 30a.

According to an advantageous arrangement of this invention and for practical reasons, the relatively important heights may be divided into fractions by using two or more biological filters disposed in series. In this case, the washing rates may differ between the first filters of the series, which are exposed to a faster clogging, and the last filters which become less loaded with polluting matter.

According to the degree of fouling of the biological filter, which is subordinate to the output filtered between two washing steps and also to the content of dissolved pollution in the water of the sewage to be treated, the wash water volume may vary from 1 to 5% of the treated output. This wash water may consist of purified water stored in a tank 35 provided for this purpose, this purified water being injected into the filter via conduit 24 by means of a feed pump 36.

The fact of recycling the wash water via the overflow device 30 to a position upstream of the settling-flocculation station 11 permits a permanent reseeding of the water, and therefore the maintaining of a very varied active biological mass comprising not only bacteria, but also predatory protozoa which, by limiting by themselves any bacterial proliferations, makes it possible to dispense with the addition of toxic reagents, so that only innocuous iron salts or alumina salts are used for flocculation.

The pre-aeration of water by means of the porous device 19, such as a high diffusion dome or tube disposed within the mass of water maintained above the bed is definitely necessary for obtaining a high oxygen concentration in this mass, i.e., as close as possible to saturation value, before percolating the water through the filter material, in order to develop strictly aerobic strains and optional aerobic strains. This oxygenation of the previously flocculated and decanted water is extremely rapid and affords a highly efficient purification with a low oxygen consumption, of the order of 7 to 8 mg per liter, by using in the same apparatus a strictly aerobic flora and an optional aerobic flora, the resulting aerobiosis being such that it permits the destruction of nitrogen compounds through the double effect of nitrification and denitrification.

Figure 1:
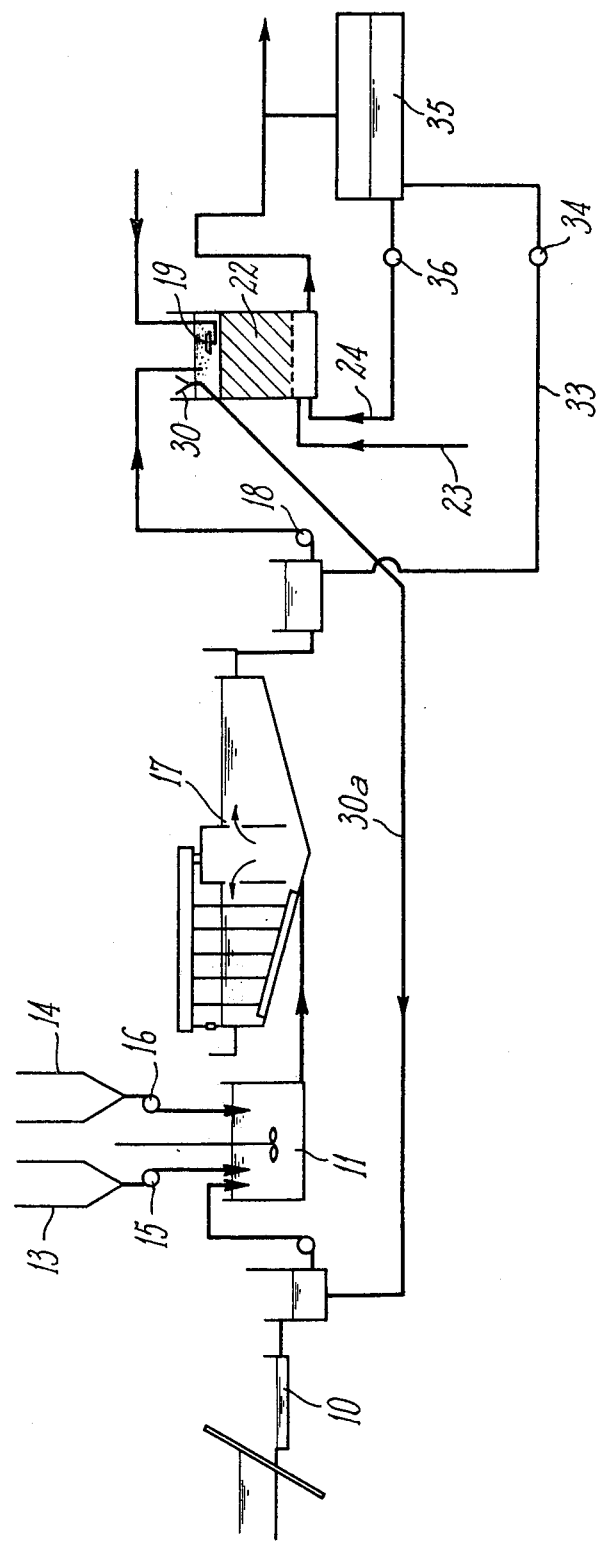
FIG. 1 is a diagrammatic side elevational view of a system employing the process of the present invention.

Thus, for example, a pilot plant of the type illustrated diagrammatically in FIG. 1 gave the following results (calculated on the average of a 15-day continuous run) by treating town sewage containing a high proportion of industrial wastes:

| Sewage | | | | | Water after flocculation/decantation, mg per liter | | | | |
| --- | --- | --- | --- | --- | --- | --- | --- | --- | --- |
| BOD | COD | MS | P | N | BOD | COD | MS | P | N (NH₄) |
| 146 | 446 | 182 | 7.75 | 25.8 | 63 | 166 | 39 | 1.7 | 14 |

| Filter water without recycling the purified water through the filter | | | | | Filter water with recycling of the purified water through the 100 % recycled filter | | | | |
| --- | --- | --- | --- | --- | --- | --- | --- | --- | --- |
| BOD | COD | MS | P | N | BOD | COD | MS | P | N (NH₄) |
| 24 | 104 | 18.2 | 1.35 | 0.9 | 12 | 54 | 6.4 | 0.95 | 0.8 |

In this example, the biological filter is supplied at the rate of 4 cubic meters per square meter of surface area per hour, and was capable of eliminating 2 kg of $BOD_5$ per cubic meter of filtering mass.

The plant as described hereinabove may be completed if necessary, for example if it is desired to remove coloring matters, tannins, etc. with adsorption means, for example of the activated carbon type, the biological purification previously performed according to the method disclosed herein ensuring in this case a very high efficiency while avoiding the possibility of clogging the activated carbon on account of an unduly strong bacterial proliferation.

If it is desired to perform a refining operation on the solid matter in suspension and the corresponding pollution, the plant as described hereinabove and illustrated in the drawings may be completed by a separate sand filter. A double-layer biological filter may also be used in this plant, the upper layer consisting of the material for fixing the purifying bacterial flora and the lower layer of a low-granulometry layer of different density, acting in this case as a refining filter.

What I claim is:

1. A process for purifying waste water containing organic pollution, said process comprising:
   introducing said waste water into a flocculation tank, introducing into said flocculation tank as flocculation reagents at least one material selected from the group consisting of aluminum salts and iron salts in amounts which are non-toxic to protozoa and bacteria, and subjecting said waste water to the action of said flocculation reagents to eliminate from said waste water materials in suspension and colloidal material, thus forming flocculated water having dissolved pollutants therein;
   providing a biological filter comprising a filter bed formed of a porous mass of granular material having on the surfaces thereon smooth zones capable of supporting a bacterial film and limited hollow zones capable of supporting a bacterial film and retaining such bacterial film even when said filter is subjected to severe backwashing, said step of providing said porous mass of granular material comprising burning clay with dextrin therein at approximately 900°C to form fragments having said surfaces of smooth and hollow zones and having a grain size of from 0.5 to 10 mm;
   providing a reservoir area on the top surface of said filter;
   supplying said flocculated water into said reservoir area to immerse said filter in said flocculated water;
   introducing air into said flocculated water in said reservoir area and thus aerating said flocculated water;
   passing said flocculated water downwardly from said reservoir area into said filter to form a bacterial film on said smooth zones and hollow zones of said surfaces of said granular material, and thereby biologically purifying said flocculated water to form purified water;
   removing said purified water from said filter; and
   periodically performing a backwashing operation on said filter including:
   injecting a washing liquid into said filter in a direction opposite to the direction of passage therethrough of said flocculated water;
   removing said bacterial film from said smooth zones of said surfaces of said granular material;
   retaining said bacterial film in said hollow zones of said surfaces of said granular material;
   collecting said washing liquid and thus removed bacterial film; and
   recycling said thus collected washing liquid and removed bacterial film into said waste water at a position upstream of said flocculation tank.

2. A process as claimed in claim 1, wherein said grain size is from 2 to 3 mm.

3. A process as claimed in claim 1, wherein said flocculation reagents consist of an aluminum salt such as aluminum sulfate.

4. A process as claimed in claim 1, wherein said flocculation reagents consist of an iron salt such as ferric chloride.

5. A process as claimed in claim 1, wherein said washing liquid comprises a portion of said purified water.

6. A process as claimed in claim 5, further comprising introducing air into said filter with said washing liquid during said backwashing operation.

* * * * *